3,159,603
CATALYTIC CONDENSATION OF POLYMERS OF ALPHA-ALKENYL KETONES

Alfred H. Sporer and Charles E. Allman, San Jose, Calif., assignors to International Business Machines Corporation, New York, N.Y., a corporation of New York
No Drawing. Filed Mar. 17, 1960, Ser. No. 15,545
12 Claims. (Cl. 260—63)

Our invention relates to the preparation of colored cyclic polymers and more particularly to the catalytic condensation of polymers of lower α-alkenyl ketones.

C. S. Marvel et al., Journal of the American Chemical Society, vol. 60, pages 280–284, and vol. 64, pages 92–94, disclose a process for the condensation of polymers of two α-lower alkenyl ketones, methyl vinyl ketone and methyl isopropenyl ketone. In the disclosed process, the ketone polymers were heated under vacuum at temperatures of 270–360° C. for 5–12 hours to obtain a conjugated colored polymer.

We have now discovered a catalytic process for the condensation of α-lower alkenyl ketone polymers in which the polymer is catalytically condensed at low temperatures and at atmospheric pressure.

Generally, our process comprises contacting a linear lower alkenyl ketone, i.e., vinyl ketone, polymer with a Lewis acid catalyst to form the desired conjugated polymer.

Suitable linear polymers can be prepared from monomers having the structural formula

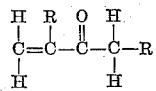

R is H or lower alkyl

Examples of monomers having this structural formula include methyl vinyl ketone, methyl isopropenyl ketone, ethyl isopropenyl ketone, etc. The Lewis acid catalysts which are useful in our process include zinc chloride, aluminum trichloride, stannic chloride, boron trifluoride, sulfur trioxide, boron trichloride, aluminum tribromide, etc. In most instances we prefer to utilize solid Friedel-Crafts catalysts, but in some instances we find it preferable to utilize liquid and gaseous catalysts. For example, boron trifluoride is the catalyst of choice when it is desired to substantially remove the catalyst from the polymer solution at a desired stage in the polymerization process because it can be readily boiled out of solution. Similarly, liquid catalysts can be utilized to advantage where they can be removed from the conjugated polymer by a filtration and solvent washing.

The amount of catalyst utilized in our process depends upon the desired color density of the final conjugated polymers, the desired reaction temperature and polymerization time, the particular catalyst used and the polymer and catalyst solvents. A chemist having the knowledge that Lewis acid catalysts are useful catalysts for conjugation of polyvinylketone polymers can readily adapt applicants' process to his own ends by a series of routine experiments wherein all variables except one are held constant and the one varied until optimum conditions are established for that variable. This procedure is then followed for other variables, if needed, until the desired optimum process is evolved.

Salts, such as ferric chloride, have considerably greater catalytic activity under anhydrous conditions than when in the presence of water. This generalization does not hold true for mineral acid anhydrides which have excellent catalytic activity in the acid form. The activity is proportional to about the 2.5 power of the mineral acid concentration. The following table sets out the amounts of various catalysts required to polymerize 100 gm. of polyisopropenyl methyl ketone under aqueous and anhydrous conditions or at various temperatures.

*Preparation of Polycyclic Polyisopropenyl Methyl Ketone From 1% Solution*

| Temp., °C. | Catalyst | Weight Catalyst (gms./100 gm. polymer) | Polymerization Time (min.) |
|---|---|---|---|
| 80 | 0.02M BF₃ [1] | 26 | 2–5 |
| 80 | 0.2M FeCl₃ | 120 | 1–5 |
| 80 | AlCl₃ | 20 | 2 3 |
| 80 | 0.02H Cl | 7.2 | 2–5 |
| 20 | 0.2H Cl | 72 | 5–15 |

[1] Etherate.
[2] Precipitates polymer.

As indicated previously, the utilization of our process reduces considerably the temperatures at which a colored polymer can be formed. This low temperature color change can be utilized to advantage in the copying art. For example, solutions of the polyalkylene ketone polymers can be microencapsulated and applied to a supporting backing. When the microcapsules are ruptured by printing or writing pressure, the polymer is released in the area of the pressure and can be "developed," i.e., conjugated, by exposing the released polymer to a gaseous Lewis acid catalyst in a process somewhat analogous to the Ozalid process wherein an azo dye is colored by exposure to gaseous ammonia. Alternately, the support on which the polymer has been released can be developed in a "wet" process by dipping the paper in a solution of catalyst. The backing can also be impregnated with fine particles of the solid catalyst and the released polymer cyclized on contact with the catalyst at room temperature or by a heat treatment in the familiar Thermofax type machine. Alternatively, the backing may be coated with the polymer and the catalyst would then be encapsulated. Where released it would produce a color.

The process of our invention can also be utilized in photographic papers. Thus, a paper backing is impregnated with a polyvinyl ketone and a mixture of a halogenated vinylog polymer capable of dehydrohalogenation on exposure to actinic light. The impregnated paper is exposed to image defining actinic light to release hydrochloric acid in exposed areas and heated to catalytically cyclize the polyketone.

The following examples more fully illustrate our invention, however, it is not intended that our invention be limited to the temperatures, polymers, catalysts, or concentrations shown. Rather, it is intended that all equivalents obvious to those skilled in the art be included within the scope of our invention as claimed.

EXAMPLE 1

A 13 mg. portion of BF₃(Et₂O)₂ dissolved in 1 ml. of tetrahydrofuran was added to 5 ml. of 1% polyisopropenyl methyl ketone in methyl ethyl ketone and the solution heated to about 80° C. The solution turned brown within 2 minutes and dark purple within about 7 minutes. The polymer remained in solution with the same intense purple color even after 15 minutes' boiling.

EXAMPLE 2

A 60 mg. portion of anhydrous FeCl₃ was added to 5 ml. of 1% polymethylisopropenyl ketone and methyl ethyl ketone. The solution was heated to the boiling point of methyl ethyl ketone. In less than about 2.5 minutes the color became brown and deepened in color to an intense brown within 6 minutes.

EXAMPLE 3

Following the procedure of Example 2, 10 mg. of anhydrous AlCl$_3$ was added to 5 ml. of 1% polyisopropenyl methyl ketone and methyl ethyl ketone. A polymer precipitate formed immediately and on heating the solution to the boiling point of the methyl ethyl ketone, the solution turned a light purple.

EXAMPLE 4

A 0.1 mg. portion of polyvinylmethyl ketone was dissolved in 5 ml. of methylethyl ketone. To the solution was added 0.1 ml. of 9 N hydrochloric acid. The solution was heated to the boiling point of methylethyl ketone. A brownish color developed within 1 minute. After 3 minutes the solution was a murky red-brown and after 10 minutes a purplish-black polymer settled out of the solution.

EXAMPLE 5

Hydrochloric acid, 0.1 ml. of 1 N HCl was added to 5 ml. of 1% polyisopropenyl methyl ketone in methyl ethyl ketone and the solution heated on a steam bath to the boiling point of methyl ethyl ketone. A brown color formed within 2 minutes and developed to a dark brown precipitate within 5 minutes. On further heating for 10 minutes, the polymer formed an insoluble reddish-brown gel.

We claim:

1. A process for the preparation of conjugate ethylenically unsaturated homopolymers consisting essentially of contacting a poly($\alpha$-lower alkenyl)ketone of an $\alpha$-lower alkenyl ketone having the formula

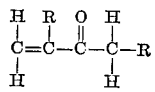

wherein R is selected from the group consisting of hydrogen and lower alkyl, with a catalyst selected from the group consisting of zinc chloride, aluminum chloride, stannic chloride, ferric chloride, boron fluoride, boron chloride, aluminum bromide, hydrogen halide, and sulphuric acid, in an amount and at a temperature sufficient to cause intra-aldol condensation and dehydration of said polyketone to form a substantially conjugated ethylenically unsaturated homopolymer.

2. The process of claim 1 wherein the condensation is carried out under substantially anhydrous conditions and the catalyst is boron trifluoride.

3. The process of claim 1 wherein the condensation is carried out under substantially anhydrous conditions and the catalyst is boron trichloride.

4. The process of claim 1 wherein the condensation is carried out under substantially anhydrous conditions and the catalyst is stannic chloride.

5. The process of claim 1 wherein the condensation is carried out under substantially anhydrous conditions and the catalyst is aluminum chloride.

6. The process of claim 1 wherein the condensation is carried out under substantially anhydrous conditions and the catalyst is zinc chloride.

7. The process of claim 1 wherein the condensation is carried out under substantially anhydrous conditions and the catalyst is ferric chloride.

8. The process of claim 1 wherein the catalyst is hydrochloric acid.

9. The process of claim 1 wherein the poly($\alpha$-lower alkenyl)ketone is contacted with hydrogen halide at ambient room temperature.

10. The process of claim 1 wherein the aldol condensation and dehydration of said poly($\alpha$-lower alkenyl) ketone is carried out in a solvent selected from the group consisting of alkyl ketones and water.

11. The process of claim 1 wherein the poly($\alpha$-lower alkenyl)ketone is contacted with sulphuric acid at ambient room temperature.

12. The process of claim 1 wherein the intra-aldol condensation and dehydration of poly($\alpha$-lower alkenyl)ketone is carried out in an alkyl ketone solvent and under substantially anhydrous conditions.

References Cited in the file of this patent

UNITED STATES PATENTS

| 2,469,847 | Rumscheidt et al. | May 10, 1949 |
| 3,004,932 | Despic et al. | Oct. 17, 1961 |

FOREIGN PATENTS

| 554,668 | Germany | July 13, 1932 |

OTHER REFERENCES

Marvel et al.: J. Amer. Chem. Soc., vol. 60, 1938, pp. 280–283.